United States Patent
Keener et al.

(10) Patent No.: US 6,911,492 B2
(45) Date of Patent: Jun. 28, 2005

(54) DISCOLORATION RESISTANT POLYPROPYLENE BLEND

(75) Inventors: Brian D. Keener, Evansville, IN (US); Deenadayalu Chundury, Newburgh, IN (US); Thomas L. McElyea, Newburgh, IN (US); J. R. Seymour, Wadesville, IN (US); Curtis A. Hofmann, Copley, OH (US); James C. Vaughn, Evansville, IN (US); L. Steven Edge, Evansville, IN (US)

(73) Assignee: Ferro Corporation, Cleveland, OH (US)

( * ) Notice: Subject to any disclaimer, the term of this patent is extended or adjusted under 35 U.S.C. 154(b) by 141 days.

(21) Appl. No.: 10/345,888

(22) Filed: Jan. 16, 2003

(65) Prior Publication Data

US 2004/0143047 A1 Jul. 22, 2004

(51) Int. Cl.[7] ............................................. C08K 5/09
(52) U.S. Cl. ................................................. 524/399
(58) Field of Search ............................................ 524/399

(56) References Cited

U.S. PATENT DOCUMENTS

| 5,106,696 A | 4/1992 | Chundury et al. |
| 5,264,280 A | 11/1993 | Chundury et al. |
| 5,321,081 A | 6/1994 | Chundury et al. |
| 5,385,781 A | 1/1995 | Chundury et al. |
| 5,969,027 A | 10/1999 | Chundury et al. |
| 6,365,658 B1 * | 4/2002 | Kjellqvist et al. .......... 524/377 |
| 6,706,215 B1 * | 3/2004 | Valet et al. ................. 252/402 |

* cited by examiner

*Primary Examiner*—Peter D. Mulcahy
(74) *Attorney, Agent, or Firm*—Rankin, Hill, Porter & Clark LLP

(57) ABSTRACT

The present invention provides a thermoformable polymer blend that resists surface discoloration when exposed to acidic environments, such as exist within a clothes treating apparatus having an interior region into which is introduced a conditioning composition comprising from about 0.001% to about 10% of a diethylene glycol, from about 0.01% to about 10% of a beta cyclodextrin, from about 0.001% to about 5% of a surfactant, from about 0% to about 2% of a preservative, and the balance water. The discoloration resistant thermoformable polymer blend according to the invention includes:

(A) a polymer package including a blend of:
  (Ai) one or more homopolymers and/or copolymers of polypropylene;
  (Aii) one or more polymers of vinyl aromatic monomers;
  (Aiii) one or more block polymers; and
  (Aiv) one or more styrene-maleic anhydride copolymers;

(B) a surface treated mineral filler;
(C) an antioxidant package;
(D) a zinc-based lubricant; and
(E) optionally, a titanium dioxide based colorant system.

9 Claims, No Drawings

DISCOLORATION RESISTANT POLYPROPYLENE BLEND

FIELD OF INVENTION

The present invention relates to a polymer blend and, more particularly, to a discoloration resistant polymer blend comprising polypropylene.

BACKGROUND OF THE INVENTION

Polymer blends comprising polypropylene are well known in the prior art. Various polymer blends comprising polypropylene are disclosed, for example, in Chundury et al., U.S. Pat. Nos. 5,264,280, 5,321,081, and 5,969,027. Polymer blends comprising polypropylene provide a lower cost alternative to engineering resins such as acrylonitrile butadiene styrene (ABS) polymer resins, and are thus used in a variety of applications including, for example, preparing parts for the automotive industry, for communication devices such as telephones, radios, televisions, cassettes, for power tools, for appliances, for floor care products, for business machines, and in the manufacture of toys and furniture.

Ferro Corporation, the assignee of the present application, markets a variety of polymer blends comprising polypropylene under the OPTUM® trademark. One of the OPTUM® polymer blends sold by Ferro Corporation comprises a calcium carbonate filled blend of polypropylene impact copolymer, styrene-butadiene block copolymer, polystyrene, and styrene-maleic anhydride copolymer. This polymer blend is particularly suitable for use in thermoforming parts for conventional clothes washing appliances. In such applications, this thermoformed polymer blend retains its intended coloration despite being frequently exposed to aqueous detergents that create a neutral to mildly basic pH environment.

Recently, a new type of clothes treating apparatus has been introduced for use by consumers whereby compressed air and an atomized conditioning composition are introduced into the interior region of the apparatus in order to "refresh" one or more articles of clothing hanging therein.

The conditioning or cleaning composition used in these devices creates an environment that is slightly acidic (i.e., a pH of from about 5.0 to about 5.5), which is unusual since most cleaning environments are basic in pH. It was discovered that conventional calcium carbonate filled blends of polypropylene impact copolymer, styrene-butadiene block copolymer, polystyrene, and styrene-maleic anhydride copolymer sold by Ferro Corporation under the OPTUM® mark tend to develop an unsightly pinkish surface discoloration when placed in this acidic environment. The discoloration tends to form after a period of 7–10 days or roughly 20 conditioning cycles. The discoloration does not correlate with widely reported "gas-fading" phenomena. Instead, the discoloration involves the surface deposition of a color-chemical complex borne from prolonged contact of the detergent mist with the thermoformed part. The pinkish surface discoloration could be easily wiped from the surface of the thermoformed interior liner, but it quickly returned upon additional exposure to the acidic detergent mist environment.

BRIEF SUMMARY OF THE INVENTION

The present invention provides a thermoformable polymer blend that resists surface discoloration when exposed to acidic environments. The polymer blend according to the invention comprises: (A) a polymer package; (B) a surface-treated mineral filler; (C) an antioxidant package; and (D) a blend of zinc compounds. The polymer package (A) comprises a blend of: (Ai) one or more homopolymers and/or copolymers of polypropylene; (Aii) one or more polymers of vinyl aromatic monomers; (Aiii) one or more block polymers; and (Aiv) one or more styrene-maleic anhydride copolymers.

The thermoformable polymer blend according to the invention is particularly suitable for forming parts that will be exposed to acidic environments such as, for example, the environment that exists within a clothes treating apparatus having an interior region into which is introduced a conditioning composition comprising from about 0.001% to about 10% of a diethylene glycol, from about 0.01% to about 10% of a beta cyclodextrin, from about 0.001% to about 5% of a surfactant, from about 0% to about 2% of a preservative, and the balance water. Unlike conventional polymer blends comprising polypropylene, the polymer blend according to the invention resists surface discoloration when exposed to such an environment. Without being bound to a particular theory, applicants believe the combination of a heavily surface treated mineral filler, the decreased loading of antioxidants, and the presence of a blend of zinc compounds in the polymer blend synergistically operate to inhibit and/or retard the formation of color producing species, such as chromophores, on the surface of the thermoformed part.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

As noted above, the discoloration resistant polymer blend composition according to the present invention comprises: (A) a polymer package; (B) a surface treated mineral filler; (C) an antioxidant package;. (D) a blend of zinc compounds; and optionally (E) one or more pigments and/or colorants. Each of the components comprising the polymer blend according to the invention is separately discussed in greater detail below.

(A) Polymer Package

The discoloration resistant polymer blend composition according to the present invention comprises from about 20% to about 95% by weight, and more preferably about 40% to about 70%, and most preferably about 55% by weight, of a polymer package (A). The polymer package (A) preferably comprises a blend of: (Ai) from about 45% to about 90% by weight of one or more homopolymers and/or copolymers of polypropylene; (Aii) from about 8% to about 45% by weight of one or more polymers of vinyl aromatic monomers; (Aiii) from about 3% to about 20% of one or more block polymers; and (Aiv) from about 0.1% to about 10% by weight of one or more styrene-maleic anhydride copolymers. Each of the polymers comprising the polymer package is separately discussed in greater detail below.

(Ai) Homopolymers and/or Copolymers of Polypropylene

The polymer package (A) comprises from about 45% to about 90% by weight, and more preferably from about 50% to about 75% by weight, and most preferably about 65% by weight, of one or more homopolymers and/or copolymers of polypropylene (Ai). The polypropylene homopolymers and/or copolymers used in the composition according to the invention may either be semicrystalline or crystalline in structure. The number average molecular weight of such polypropylene polymers is preferably above about 10,000, and more preferably above about 50,000.

Polypropylene impact copolymers for use in injection molding are particularly preferred for use in the invention. Such copolymers of polypropylene typically have a melt flow value of less than about 2.0, and most preferably of about 0.5, as measured in accordance with the ASTM D1238 standard. The presently most preferred polypropylene impact copolymer for use in the invention is available from BP Amoco Polymers, Inc. as ACCTUF® 3045 Impact Copolymer. There are many other homopolymers and/or copolymers of polypropylene available in the market that are suitable for use in the invention.

(Aii) Polymers of Vinyl Aromatic Monomers

The polymer package (A) further comprises from about 8% to about 45% by weight, more preferably from about 10% to about 35% by weight, and most preferably about 22.5% by weight, of one or more polymers of vinyl aromatic monomers (Aii). The vinyl aromatic polymer can be a homopolymer of a vinyl aromatic monomer, or a copolymer of a vinyl aromatic monomer and at least one monomer selected from the group consisting of an acrylic acid or ester, a methacrylic acid or ester, and acrylonitrile.

The preferred vinyl aromatic monomer is styrene. Substituted styrenes can also be used. In one embodiment, the vinyl aromatic monomer is represented by the following formula:

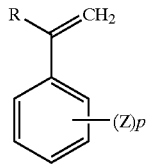

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus.

Specific examples of vinyl aromatic compounds such as represented by the above formula include, for example, in addition to styrene, alpha-methylstyrene, beta-methylstyrene, vinyl toluene, 3-methylstyrene, 4-methylstyrene, 4-isopropylstyrene, 2,4-dimethylstyrene, o-chlorostyrene, p-chlorostyrene, o-bromostyrene, and 2-chloro-4-methylstyrene.

Specific examples of polymers of vinyl aromatic compounds include polystyrene, poly(alpha-methylstyrene), poly(p-methylstyrene) and high impact polystyrene (HIPS). Polystyrene is the preferred vinyl aromatic homopolymer. The presently most preferred polystyrene for use in the invention is available from Dart Polymers, Inc. as DART® 108.

In another embodiment, (Aii) is a copolymer of a vinyl aromatic monomer and a monomer selected from the group consisting of an unsaturated monocarboxylic reagent and a dicarboxylic reagent. The carboxylic reagents include carboxylic acids per se and their functional derivatives such as anhydrides, imides, metal salts, and esters, which are capable of being forming polymers with the vinyl aromatic monomer. The unsaturated monocarboxylic acid reagents are carboxylic acids and esters corresponding to the formula:

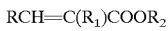

wherein R is hydrogen or a saturated aliphatic or alicyclic, aryl, alkaryl or heterocyclic group; $R_1$ is hydrogen or an alkyl group; and $R_2$ is hydrogen or an alkyl, aryl, or heterocyclic group. Preferably, R is hydrogen or an alkyl group containing from 1 to about 10 carbon atoms. Preferably, $R_1$ is hydrogen or an alkyl group containing from 1 to about 10 carbon atoms. Preferably, $R_2$ is hydrogen or an alkyl group having from 1 to about 10 carbon atoms. The total number of carbon atoms in R and $R_1$ should not exceed 18 carbon atoms. Specific examples of useful monobasic carboxylic reagents include acrylic acid, methacrylic acid, crotonic acid, and acrylic anhydride. Specific examples of esters include methyl, ethyl, propyl, butyl acrylate and methacrylate.

(Aiii) Block Polymers

The polymer package (A) further comprises from about 3% to about 20% by weight, more preferably from about 5% to about 15% by weight, and most preferably about 11% by weight, of one or more block polymers a vinyl aromatic monomer and a conjugated diene, a partially hydrogenated derivative thereof, or a selectively hydrogenated derivative thereof to which has been grafted a unsaturated carboxylic reagent (Aiii). The block polymers, usually block copolymers, may be diblock, triblock, multiblock, starblock, polyblock or graftblock polymers. Throughout this specification and claims, the terms diblock, triblock, multiblock, polyblock, and graft or grafted-block with respect to the structural features of block polymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers*, Science Technology, Dale J. Meier, Ed., Harwood Academic Publishers, 1979, at pages 1–5.

The block polymers may contain various ratios of conjugated dienes to vinyl aromatic monomer. Accordingly, multiblock polymers may be utilized which are linear or radial symmetric or asymmetric and which have structures represented by the formulae A-B, A-B-A, A-B-A-B, B-A-B, $(AB)_{0,1,2}$ . . . BA, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As is well known, tapered polymer blocks can be incorporated in the multiblock copolymers by copolymerizing a mixture of conjugated diene and vinyl aromatic monomer monomers utilizing the difference in their copolymerization reactivity rates. Various patents describe the preparation of multiblock copolymers containing tapered copolymer blocks including U.S. Pat. Nos. 3,251,905; 3,639,521; and 4,208,356, the disclosures of which are hereby incorporated by reference.

Conjugated dienes that may be utilized to prepare the polymers and copolymers are those containing from 4 to about 10 carbon atoms and more generally, from 4 to 6 carbon atoms. Examples include 1,3-butadiene, 2-methyl-1,3-butadiene (isoprene), 2,3-dimethyl-1,3-butadiene, chloroprene, 1,3-pentadiene, and 1,3-hexadiene. Mixtures of these conjugated dienes also may be used. The preferred conjugated dienes are isoprene and 1,3-butadiene.

The vinyl aromatic monomers that may be utilized to prepare the copolymers have been previously described above. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 500,000, and more preferably from about 40,000 to about 300,000. The presently most preferred block polymer (Aiii) for use in the invention is a styrene-butadiene radial block copolymer available from Atofina S. A. as FINAPRENE® 602.

The average molecular weights of the individual blocks within the polymers may vary within certain limits. In most instances, the vinyl aromatic block will have a number average molecular weight in the order of about 2000 to about 125,000, and preferably between about 4000 and 60,000. The conjugated diene blocks either before or after hydrogenation will have number average molecular weights in the order of about 10,000 to about 450,000 and more preferably from about 35,000 to 150,000.

Also, prior to hydrogenation, the vinyl content of the block polymer is from about 10% to about 80%, and the vinyl content is preferably from about 25% to about 65%, particularly 35% to 55% when it is desired that the modified block polymer exhibit rubbery elasticity. The vinyl content of the block polymer can be measured by means of nuclear magnetic resonance.

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, alpha-methylstyrene-isoprene-alpha-methylstyrene, and their partially hydrogenated derivatives.

The selective hydrogenation of the block polymers may be carried out by a variety of well-known processes including hydrogenation in the presence of such catalysts as Raney nickel, noble metals such as platinum and palladium, and soluble transition metal catalysts. Suitable hydrogenation processes which can be used are those wherein the diene-containing polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5% to about 20% of their original unsaturation content prior to hydrogenation.

In one embodiment, the conjugated diene portion of the block polymer is at least 90% saturated and more often at least 95% saturated while the vinyl aromatic portion is not significantly hydrogenated. Particularly useful hydrogenated block polymers are the hydrogenated block polymers of styrene-isoprene-styrene such as an (ethylene/propylene)-styrene block polymer. When a polystyrene-polybutadiene-polystyrene block polymer is hydrogenated, it is desirable that the 1,2-polybutadiene to 1,4-polybutadiene ratio in the polymer is from about 30:70 to about 70:30. When such a block polymer is hydrogenated, the resulting product resembles a regular polymer block of ethylene and 1-butene (EB). As noted above, when the conjugated diene employed is isoprene, the resulting hydrogenated product resembles a regular polymer block of ethylene and propylene (EP).

In another embodiment, the selectively hydrogenated block polymer is of the formula:

$$B_n(AB)_oA_p$$

wherein n=0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic monomer block having a number average molecular weight of from about 2000 to about 115,000; the blocks of A constituting about 5% to about 95% by weight of the polymer; and the unsaturation of the block B is less than about 10% of the original unsaturation. In other embodiments, the unsaturation of block B is reduced upon hydrogenation to less than 5% of its original value, and the average unsaturation of the hydrogenated block polymer is reduced to less than 20% of its original value.

The block polymers of the vinyl aromatic monomer and the conjugated diene may also be grafted with one or more of the above described unsaturated monocarboxylic or dicarboxylic reagents. The carboxylic reagents include carboxylic acids per se and their functional derivatives such as anhydrides, imides, metal salts, and esters, which are capable of being grafted onto the selectively hydrogenated block polymer. The grafted polymer will usually contain from about 0.2% to about 20%, and preferably from about 0.1% to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preferred dicarboxylic reagents for use in the invention are maleic reagents. The maleic reagents may generally be represented by the formula:

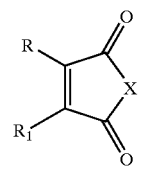

wherein each R or $R_1$ group is hydrogen or an aliphatic or aromatic hydrocarbyl group or the R and $R_1$ groups are joined together to form a fused ring derivative, X is —O— or =$NR_2$ where $R_2$ is a hydrocarbyl group which may be an aliphatic or an aromatic hydrocarbyl group such as phenyl, methyl, ethyl, propyl, butyl, etc. Preferably both R and $R^1$ groups are hydrogen.

Examples of maleic derivatives that are cyclic or bicyclic compounds include those obtained by a Diels-Alder reaction of butadiene with maleic anhydride or a maleimide. Those obtained by a Diels-Alder reaction of cyclopentadiene with maleic anhydride or maleimide, and those obtained by a Diels-Alder reaction of isoprene with maleic anhydride or an N-substituted maleimide. These cyclic or bicyclic derivatives have high glass transition temperatures. Examples of dicarboxylic reagents include maleic acid, maleic anhydride, fumaric acid, mesaconic acid, itaconic acid, citraconic acid, itaconic anhydride, citraconic anhydride, monomethyl maleate, monosodium maleate, etc.

The copolymers of the vinyl aromatic monomers with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic monomer to a temperature at which the vinyl aromatic monomer will polymerize, (2) stirring the polymerizing vinyl aromatic monomer while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic monomer is polymerizing. Procedures for preparing such copolymers are known in the art and have been described in, for example, U.S. Pat. No. 2,971,939.

The preparation of various selectively hydrogenated block polymers of conjugated dienes and vinyl aromatic monomers that have been grafted with a carboxylic acid reagent is described in a number of patents including U.S. Pat. Nos. 4,578,429, 4,657,970, and 4,795,782, and the disclosures of these patents relating to grafted selectively hydrogenated block polymers of conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

The block polymer (Aiii) may also comprise a block polymer of a vinyl aromatic monomer and a conjugated diene, or a partially hydrogenated derivative thereof, or a selectively hydrogenated derivative thereof to which has been grafted an unsaturated carboxylic reagent.

(Aiv) Styrene-Maleic Anhydride Copolymers

The polymer package (A) also comprises from about 0.1% to about 10% by weight, and more preferably from about 0.5% to about 5.0% by weight, and most preferably about 2.0% by weight, of one or more styrene-maleic anhydride copolymers (Aiv). A variety of styrene-maleic anhydride copolymers (SMA) are available commercially from Nova Chemicals, Inc. under the DYLARK® trade designation. The presently most preferred styrene-maleic anhydride copolymer for use in the invention is available from Nova Chemicals, Inc. as DYLARK® 250.

(B) Surface Treated Mineral Filler

The polymer blend according to the invention also comprises from about 5% to about 70% by weight, and more preferably from about 20% to about 60% by weight, and most preferably about 42% by weight, of one or more surface treated mineral fillers, such as surface treated calcium carbonate. The selection of the proper surface treated mineral filler has been determined to be critical in order to obtain a polymer blend that will resist discoloration when exposed to slightly acidic environments, such as that created by commercially available conditioning compositions that are slightly acidic.

Preferably, the mineral filler comprises calcium carbonate that has been coated with a metal salt of a fatty acid and/or a fatty acid amide. Preferred metal salts are calcium and zinc salts of stearic acid and/or palmitic acid. To further retard and inhibit the formation of pinkish surface discoloration upon exposure to acidic environments, it is also important that the surface treated mineral filler have a relatively small particle size (median, in microns), preferably less than about 5 microns, and more preferably less than about 3.5 microns, and most preferably about 2.0 microns. The presently most preferred surface treated mineral filler for use in the invention is coated calcium carbonate available from Imerys Corporation under the SUPERCOAT® trade designation.

(C) Antioxidant Package

Antioxidants for polyolefin blends are well known. For example, hindered phenolic antioxidants are particularly effective in preventing deterioration of physical properties during the preparation of polymer blends and in extending the useful life of the end product. The hindered phenolic antioxidants suitable for use in the context of the present invention conform structurally to:

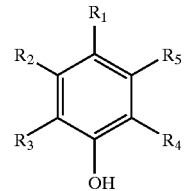

wherein $R_1$, $R_2$ and $R_5$ independently are a hydrogen atom or an alkyl group, $R_3$ and $R_4$ independently are alkyl groups containing at least 4 carbon atoms, preferably a $C_3$–$C_{10}$ alkyl group and more preferably a tertiary butyl group. Specific examples of such hindered phenols include butylated hydroxy toluene (BHT) and butylated hydroxy ethyl benzene (BHEB).

The presently most preferred antioxidant for use in the invention is available from CIBA Specialty Chemicals as IRGANOX® B-225. IRGANOX® B-225 comprises a 1:1 blend of tetrakis[methylene(3,5-di-tert-butyl-4-hydroxyhydrocinnamate)]methane, which is also independently sold by CIBA Specialty Chemicals as IRGANOX® 1010, and tris(2,4-di-t-butylphenyl) phosphite, which is also independently sold by CIBA Specialty Chemicals as IRGAFOS® 168.

Without being bound to a particular theory, applicants suspect that the phenolic antioxidants and/or phosphite-containing antioxidants used in the polymer blend may be contributing to the formation of color producing species, such as chromophores. In order to prevent discoloration, it is preferable that the least amount of such antioxidants necessary to obtain desired properties be used. Preferably, the amount used will be less than about 1.0% by weight, and more preferably less than about 0.5% by weight, and most preferably less than or equal to about 0.1% by weight.

(D) Zinc Compound

The polymer blend further comprises from about 0.001 to about 1.0% by weight, and more preferably from about 0.01 to about 0.5% by weight, and most preferably about 0.1% by weight, of one or more zinc-based lubricant compounds. Suitable zinc compounds include, for example, zinc stearate and zinc and mixtures of the foregoing. The presently most preferred zinc compound for use in the invention is a white powder comprising a 75%/25% weight percent combination of zinc stearate/zinc dibutyldithiocarbamate that is available from R. T. Vanderbilt Company, Inc. as VANOX® 898.

Without being bound to any particular theory, applicants believe that the zinc compound(s) may form complexes with potential color forming compounds, such as phenols and/or phosphites that may exist or migrate to the surface of the polymer blend to prevent the formation of chromophores and/or other color producing species.

(E) Optional Pigments and/or Colorants

The polymer blends according to the present invention can further optionally comprise up to about 10% by weight, and more preferably up to about 5.0% by weight, and most preferably about 2.75% by weight, of one or more pigments and/or colorants. Any of the conventional inorganic color pigments can be used, but the improvement in surface discoloration produced by the invention will be most apparent in lightly colored or white applications. Typically, titanium dioxide is used as a whitener and opacifier in such applications. To adjust the color and hue, one or more inorganic or organic colorants or dyes can also be used, as is well known in the art.

The polymer blend can further optionally comprise fillers and/or reinforcers. Examples of fillers and/or reinforcers included talc, calcium carbonate, mica, wollasnite, dolomite, glass fibers, boron fibers, carbon fibers, pigments, or mixtures thereof. Preferred fillers include commercially available talc such as R. T. Vanderbilt's Select-O-Sorb and glass fibers. The fillers and/or reinforcers may be treated with coupling agents to improve the bond between the fillers and/or reinforcers to the resin. For example, the fillers and/or reinforcers can be treated with materials such as fatty acids (e.g., stearic acid), silanes, maleated polypropylene, etc. The amount of coupling agents used is an amount effective to improve the bond between the fillers and/or reinforcers with the resin. Other additives may be included in the polymer blends of the present invention to modify or to obtain desirable properties.

Preparation of Polymer Blends

The blended polymer compositions of the present invention can be prepared using techniques that are well known to those skilled in the art. For example, a particularly useful procedure is to intimately mix the polymers in the polymer package using conventional melt mixing equipment such as a mill, a Banbury, a Brabender, a single or twin screw extruder, continuous mixers, or kneaders. For example, the polymers may be intimately mixed in the form of granules and/or powder in a high shear mixer. One preferred process for preparing the blended polymers utilizes the Farrell Compact Processor, CP-23 and CP-57. Short residence times and high shear are readily obtained in a CP-23 and a CP-57. "Intimate" mixing means that the mixture is prepared with sufficient mechanical shear and thermal energy to produce a dispersed phase that is finely divided and homogeneously dispersed in the continuous or principal phase.

The following examples are intended only to illustrate the invention and should not be construed as imposing limitations upon the claims. Unless otherwise indicated in the following examples and elsewhere in the specification and claims, all parts and percentages are by weight, temperatures are in degrees centigrade and pressures are at or near atmospheric.

EXAMPLE 1

Polymer Blend Compositions A and B were each separately prepared by compounding the components shown in weight percent in Table 1 below in a Farrell continuous mixer (5" CP/7" SS). Polymer Blend A is a control (i.e., not in accordance with the present invention). Polymer Blend B is a polymer blend in accordance with the present invention.

TABLE 1

| COMPONENT | BRAND OR TYPE | POLYMER BLEND A | POLYMER BLEND B |
|---|---|---|---|
| (A) Polymer Package | | | |
| Polypropylene Copolymer | ACCTUF® 3045 | 35.3743 | 35.6243 |
| Polystyrene | DART® 108 | 12.360 | 12.360 |
| Styrene Butadiene Radial Block Copolymer | FINAPRENE® 602 | 6.180 | 6.180 |
| Styrene-Maleic Anhydride Copolymer | DYLARK® 250 | 1.000 | 1.000 |
| (B) Mineral Filler | | | |
| Treated Calcium Carbonate | KISH K-2T | 41.490 | — |
| Treated Calcium Carbonate | IMERYS SUPERCOAT® | — | 41.490 |
| (C) Antioxidants | | | |
| Phenolic Antioxidant | IRGANOX® B-225 | 0.400 | 0.150 |
| Thioester Antioxidant | Witco DSTDP | 0.400 | 0.300 |
| (D) Zinc Compound | | | |
| Zinc Stearate Blend | VANOX® 898 | — | 0.100 |
| (E) Colorants | | | |
| Ultramarine Blue | EP-62 Blue | 0.0154 | 0.0154 |
| Diazobenzimidaze Yellow | 11-3073 Yellow | 0.0001 | 0.0001 |
| Organic Sunbright Red | 234 Red | 0.0002 | 0.0002 |
| Titanium Dioxide | TIONA® RCL-6 | 2.780 | 2.780 |
| TOTAL | | 100.000 | 100.000 |

Polymer Blend A and Polymer Blend B were formed using loss-in-weight feeding methods. Components C, D and E were added as a premixed add-pack. The temperature of the extruder was 200° C. The molten polymer blends were extruded through a strand die to form strands that were quickly cooled by passing through a downstream water bath, which was about 30 feet long and filled with recirculating cold water. The strands were dried using an air wipe and pelletized to form pellets about length of about 3.2 mm.

EXAMPLE 2

Pellets of Polymer Blend A and Polymer Blend B from Example 1 were each separately let down into a Toshiba ISE 90 PN injection molding machine. The pellets were heated to a temperature of 200° C. (392° F.), and were injection-molded into test bars. Type-I tensile bars were injection-molded. The bars were 5 inches long, 0.25 inches thick and 0.5 inches wide at the neck of the bar. Ten tensile bars were formed from Polymer Blend A, and ten tensile bars were formed from Polymer Blend B.

The tensile bars were exposed to 25 cleaning cycles using a commercially available slightly acidic conditioning solution comprising from about 0.001% to about 10% of a diethylene glycol, from about 0.01% to about 10% of a beta cyclodextrin, from about 0.001% to about 5% of a surfactant, from about 0% to about 2% of a preservative, and the balance water. After 25 cycles, the tensile bars were visually inspected. The surfaces of all ten of the tensile bars formed from Polymer Blend A were coated with an unsightly pinkish discoloration. The surfaces of all ten of the tensile bars formed from Polymer Blend B were bright and white, and showed no signs of discoloration at all.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A thermoformable polymer blend that resists surface discoloration when exposed to acidic environments comprising: (A) from about 20% to about 95% by weight a polymer package comprising a blend of: (Ai) from about 45% to about 90% by weight of one or more homopolymers and/or copolymers of polypropylene; (Aii) from about 8% to about 45% by weight of one or more polymers of vinyl aromatic monomers; (Aiii) from about 3% to about 20% of one or more block polymers; and (Aiv) from about 0.1% to about 10% by weight of one or more styrene-maleic anhydride copolymers; (B) from about 5% to about 70% by weight of a surface treated mineral filler; (C) up to about 1.0% by weight of an antioxidant package; (D) from about 0.001 to about 1.0% by weight of a zinc containing lubricant system; and (E) optionally from about 0.001 to about 3.5% by weight of a colorant system including titanium dioxide and blue, red, and yellow pigments.

2. The thermoformable polymer blend composition according to claim 1 wherein the surface treated mineral filler comprises calcium carbonate coated with a metal salt of a fatty acid and/or a fatty acid amide.

3. The thermoformable polymer blend composition according to claim 2 wherein the metal salt comprises a calcium salt and/or a zinc salt.

4. The thermoformable polymer blend composition according to claim 2 wherein the surface treated mineral filler has a median particle size of less than about 5 microns.

5. The thermoformable polymer blend composition according to claim 2 wherein the surface treated mineral filler has a median particle size of less than about 3.5 microns.

6. The thermoformable polymer blend composition according to claim 1 wherein the antioxidant package comprises a hindered phenolic antioxidant and/or a phosphite-containing antioxidant.

7. The thermoformable polymer blend composition according to wherein the zinc-containing lubricant system is selected from the group consisting of zinc stearate, zinc dibutyldithiocarbamate, and combinations of the foregoing.

8. The thermoformable polymer blend composition according to claim 1 further comprising one or more pigments and/or colorants.

9. The thermoformable polymer blend composition according to claim 1 wherein the acidic environment has a pH from about 5.0 to about 5.5.

* * * * *